(12) United States Patent
Ji et al.

(10) Patent No.: US 9,509,544 B2
(45) Date of Patent: *Nov. 29, 2016

(54) ROBUST SCALABLE AND ADAPTIVE FREQUENCY ESTIMATION AND FREQUENCY TRACKING FOR WIRELESS SYSTEMS

(71) Applicant: Apple Inc., Cupertino, CA (US)

(72) Inventors: Zhu Ji, San Jose, CA (US); Johnson O. Sebeni, Fremont, CA (US); Yu-Lin Wang, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/996,007

(22) Filed: Jan. 14, 2016

(65) Prior Publication Data

US 2016/0134457 A1   May 12, 2016

Related U.S. Application Data

(63) Continuation of application No. 14/058,155, filed on Oct. 18, 2013, now Pat. No. 9,264,278.

(60) Provisional application No. 61/810,206, filed on Apr. 9, 2013, provisional application No. 61/716,453, filed on Oct. 19, 2012.

(51) Int. Cl.
*H04B 1/38* (2015.01)
*H04L 27/26* (2006.01)
*H04L 25/02* (2006.01)
*H04L 27/00* (2006.01)

(52) U.S. Cl.
CPC ....... *H04L 27/2659* (2013.01); *H04L 25/0212* (2013.01); *H04L 27/266* (2013.01); *H04L 27/2682* (2013.01); *H04L 27/2688* (2013.01); *H04L 2027/0053* (2013.01)

(58) Field of Classification Search
CPC . H04L 27/362; H04L 27/0008; H04L 27/14; H04B 1/38
USPC .................. 375/219, 260, 323, 334; 455/434
See application file for complete search history.

(56) References Cited

U.S. PATENT DOCUMENTS 6,154,640 A   11/2000   Itoh et al.
6,463,266 B1  10/2002   Shohara
(Continued)

*Primary Examiner* — Hirdepal Singh
*Assistant Examiner* — Fitwi Hailegiorgis
(74) *Attorney, Agent, or Firm* — Downey Brand LLP

(57) ABSTRACT

Methods and apparatuses to determine a frequency adjustment in a mobile wireless device are disclosed. A method includes determining a coarse frequency error estimate and multiple fine frequency error estimates; selecting at least one candidate fine frequency error estimate having a frequency value closest to a corresponding frequency value for the coarse frequency error estimate; and determining a frequency adjustment based on a combination of the coarse frequency error estimate and the selected at least one candidate fine frequency error estimate. In an embodiment, the method further includes calculating a confidence metric for the coarse frequency error estimate; when the confidence metric exceeds a threshold value, determining the frequency adjustment based on the candidate fine frequency error estimate; otherwise, determining the frequency adjustment based on a fine frequency error estimate in the plurality of fine frequency error estimates closest to a most recent previous fine frequency error estimate.

20 Claims, 7 Drawing Sheets

(56) References Cited

U.S. PATENT DOCUMENTS

| | | |
|---|---|---|
| 6,816,716 B2 | 11/2004 | Shohara |
| 7,728,690 B2 | 6/2010 | Ballantyne |
| 8,731,029 B1 | 5/2014 | Wu et al. |
| 9,264,278 B2 | 2/2016 | Ji et al. |
| 2005/0095987 A1 | 5/2005 | Lyons et al. |
| 2008/0260056 A1* | 10/2008 | Du .................. H04L 27/2657 375/260 |
| 2009/0131047 A1* | 5/2009 | Amerga ............. H04W 48/16 455/434 |
| 2012/0327793 A1 | 12/2012 | Sikri et al. |
| 2013/0070874 A1 | 3/2013 | Nakagawa et al. |
| 2013/0176873 A1 | 7/2013 | Ji et al. |

\* cited by examiner

ROBUST SCALABLE AND ADAPTIVE FREQUENCY ESTIMATION AND FREQUENCY TRACKING FOR WIRELESS SYSTEMS

CROSS-REFERENCE TO RELATED APPLICATIONS

This application is a continuation of U.S. application Ser. No. 14/058,155, filed Oct. 18, 2013, which claims the benefit of U.S. Provisional Application No. 61/716,453, filed Oct. 19, 2012, and U.S. Provisional Application No. 61/810,206, filed Apr. 9, 2013, which are incorporated by reference herein in their entireties.

TECHNICAL FIELD

The described embodiments relate generally to wireless systems and more particularly to frequency estimation and tracking algorithms that combine fine frequency estimation results and coarse frequency estimation results to improve frequency estimation and tracking accuracy and stability.

BACKGROUND

Frequency tracking loops are commonly employed in wireless systems to align a receiver frequency clock to a transmitter frequency clock, or to adjust received signals to account for frequency differences between a transmitter, e.g., in a wireless access network base station, and a receiver, e.g., in a mobile wireless device. Frequency tracking loops can be used to improve accuracy when recovering a signal from a noisy communication channel and can also be used to distribute clock timing information to properly align frequency sampling clock timing pulses in digital logic designs. Variability of a frequency of a crystal oscillator (XO) clock source in a receiver, however, can result in frequency errors with respect to a transmitted carrier frequency that can lead to a relative frequency error between the clock source used in the receiver of a mobile wireless device and a clock source used in a transmitter of a base station in a wireless access network. These frequencies errors can impact the performance of reception and decoding of the received signals in the mobile wireless device, and can thereby decrease the reliability and functionality of the wireless system.

Frequency errors can affect different types of wireless systems that use different radio access technologies, including code division multiple access (CDMA) wireless systems and orthogonal frequency division multiplexed (OFDM) wireless systems. In CDMA-based wireless systems, a frequency error can deteriorate the quality of received signals. Moreover, a carrier frequency error in the receiver can translate to sampling timing errors that can accumulate over time, which can break the orthogonality of spreading codes used in CDMA-based wireless systems to differentiate signals sent to different mobile wireless devices. Orthogonality of signals provided by code division multiplexing in CDMA-based wireless systems can be critical for a receiver in a mobile wireless device to separate signals intended for the mobile wireless device from signals intended for other mobile wireless devices. Loss of orthogonality can increase an amount of interference generated by "non-orthogonal" signals that can be simultaneously received with a signal intended for a particular mobile wireless device in a CDMA-based wireless system, thereby affecting received signal performance in the particular mobile wireless device. Similarly, a carrier frequency error can affect the orthogonality of different sub-channels used in an OFDM-based wireless system, and thereby can increase inter-channel interference (ICI) between sub-channels of the OFDM-based wireless system and deteriorate the overall performance of the OFDM-based wireless system.

Accurate and robust frequency estimation and frequency tracking can be critical for designing receivers for mobile wireless devices that reliably correct for frequency errors. Different frequency error estimation and tracking schemes can be used that provide a balance between accuracy, convergence time, and frequency pull-in range. A channel impulse response (CIR) can be estimated based on a set of received pilot symbols and/or a set of received data symbols, and the resulting CIR can be used to characterize phase information of a wireless communication channel between the mobile wireless device and the base station of a wireless access network. The phase information embedded in the CIR can include an amount of accumulated frequency error due to differences in clock frequencies at a source (e.g., the base station) and a sink (e.g., the mobile wireless device). CIR techniques can be accurate but require longer convergence time, higher computing power (which can result in higher power consumption), and narrower frequency pull-in range. Alternatively, a technique that exploits a continuous phase ramping between different samples of a symbol, e.g., due to frequency errors, can be used when frequency error estimation with a larger pull-in range than afforded by a CIR based frequency error estimation method is needed. Each frequency error estimation and tracking technique can be better suited to certain received signals depending on whether a higher accuracy, narrower pull-in range, "fine" frequency tracking loop or a lower accuracy, wider pull-in range, "coarse" frequency tracking loop is required.

Therefore, what is desired is an algorithm that combines fine frequency estimation results and coarse frequency estimation results and employs methods having different precision and complexity to improve both the accuracy and robustness of frequency estimation and frequency tracking in wireless systems.

SUMMARY OF THE DESCRIBED EMBODIMENTS

In an embodiment, a method to estimate frequency errors and determine a frequency adjustment in a mobile wireless device is disclosed. The method includes at least the following steps: (1) determining a coarse frequency error estimate, (2) determining a plurality of fine frequency error estimates, (3) selecting at least one candidate fine frequency error estimate in the plurality of fine frequency error estimates, the at least one candidate fine frequency error estimate having a frequency value that is closest to a corresponding frequency value for the coarse frequency error estimate, and (4) determining a frequency adjustment based on a combination of the coarse frequency error estimate and the selected at least one candidate fine frequency error estimate. In some embodiments, the method further includes (5) calculating a confidence metric for the coarse frequency error estimate, (6) comparing the confidence metric to a pre-determined threshold value, (7) when the confidence metric exceeds the pre-determined threshold value, determining the frequency adjustment based on the candidate fine frequency error estimate, and (8) when the confidence metric does not exceed the pre-determined threshold value, determining the frequency adjustment based on a fine frequency error estimate in the plurality of fine frequency error estimates that is closest to a most recent previous fine frequency error estimate. The resulting algorithm can effectively combine fine and coarse frequency estimation results with different precision and complexity to improve the accuracy and robustness of frequency estimation and tracking in wireless systems.

In another embodiment, a mobile wireless device includes wireless circuitry including at least one transceiver, one or more processors coupled to the wireless circuitry, and a memory coupled to the one or more processors. The one or more processors are configured to execute computer-executable instructions stored within the memory to cause the mobile wireless device to determine a coarse frequency error estimate, to determine a plurality of fine frequency error estimates, to calculate a confidence metric for the coarse frequency error estimate, to compare the confidence metric to a threshold value, when the confidence metric exceeds the threshold value, to determine a frequency adjustment based on a candidate fine frequency error estimate in the plurality of fine frequency error estimates that is closest to the coarse frequency error estimate; and when the confidence metric does not exceed the threshold value, to determine the frequency adjustment based on a fine frequency error estimate in the plurality of fine frequency error estimates closest to a most recent previous fine frequency error estimate.

In a further embodiment, a non-transitory computer readable medium having computer program encoded thereon is disclosed. The computer program code, when executed by one or more processors, causes a mobile wireless device to perform the operations of determining a coarse frequency error estimate, determining a plurality of fine frequency error estimates, selecting at least one candidate fine frequency error estimate in the plurality of fine frequency error estimates, the at least one candidate fine frequency error estimate having a frequency value that is closest to a corresponding frequency value for the coarse frequency error estimate, and determining a frequency adjustment based on a combination of the coarse frequency error estimate and the selected at least one candidate fine frequency error estimate.

BRIEF DESCRIPTION OF THE DRAWINGS

The described embodiments and the advantages thereof may be understood by reference to the following description in conjunction with the accompanying drawings. The drawings provided herein do not limit any changes in form and detail that may be made to the described embodiments.

DETAILED DESCRIPTION OF SELECTED EMBODIMENTS

Figure 1:
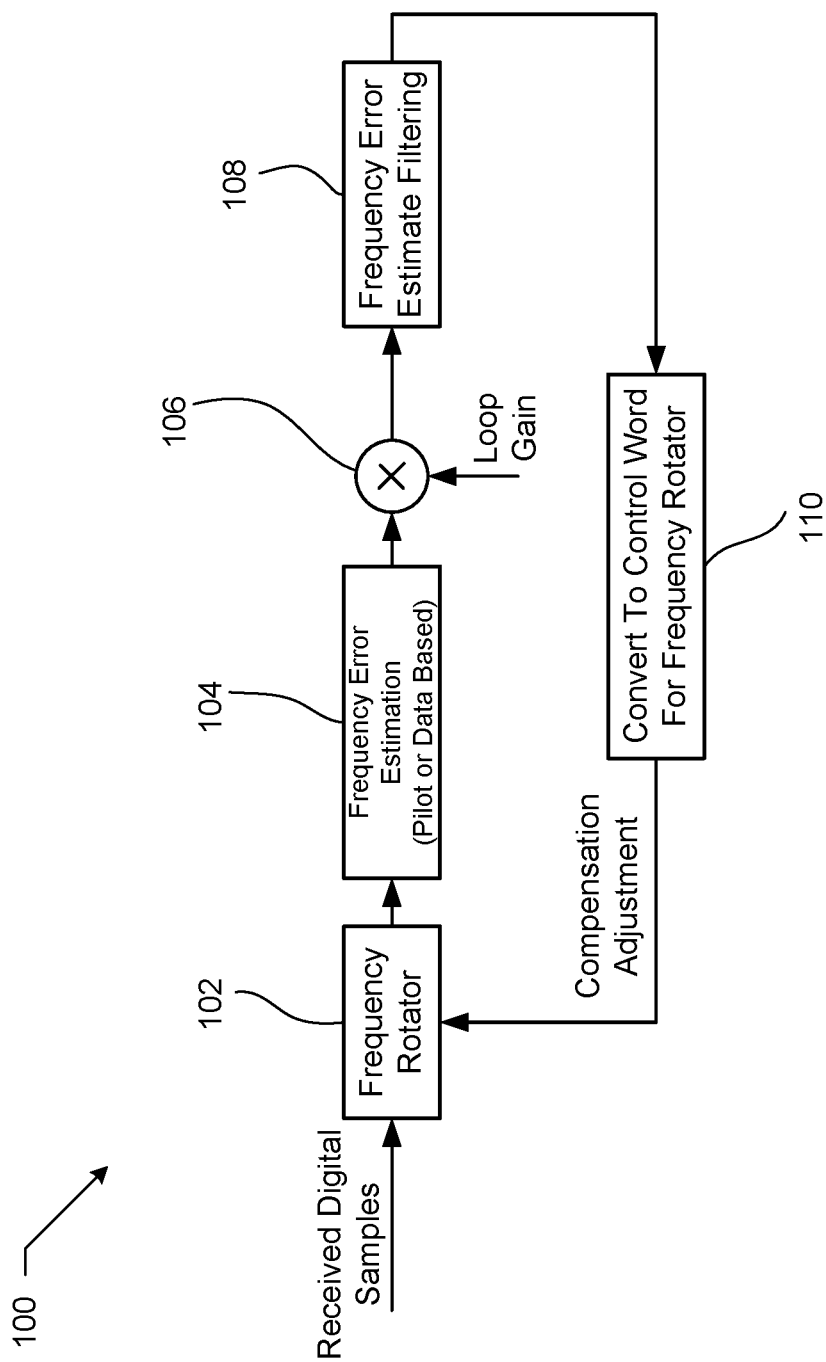
FIG. 1 illustrates a block diagram of a generic frequency tracking loop in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made while remaining within the scope of the described embodiments.

Receivers in a mobile wireless device can use a crystal oscillator (XO) clock source, which in some embodiments can include a voltage controlled crystal oscillator (VCXO) having an adjustable clock source frequency. The clock source can determine a frequency at which analog radio frequency (RF) waveforms received by the mobile wireless device are sampled and converted to a set of digital samples for demodulation and decoding by wireless circuitry in the mobile wireless device. A receiver can be referred to also, in some embodiments, as a receive signal chain, and a portion of a transceiver (transmitter/receiver combination). Sampling the received waveforms at an accurate frequency rate and phase can be required to maximize a signal to noise plus interference ratio (SINR) in the receiver of the mobile wireless device. The mobile wireless device can estimate and track frequency errors to provide a correction to the VCXO in an adaptive feedback loop. In some embodiments, receivers in the mobile wireless device can operate at a nominal "fixed" frequency and subsequent frequency adjustments can be applied to the digital received samples to compensate for clock frequency differences between the receiver in the mobile wireless device and the transmitter in the base station of the wireless access network. The adjustment of the digital samples can be accomplished, in some embodiments, by applying an appropriate frequency rotation to the digital samples to correct for the sampling frequency error. The clock source frequency in the receiver of the mobile wireless device can also vary over time due to changes in operating conditions, e.g., as component temperatures vary due to changes in ambient temperature as well as changes in power consumption of components in the mobile wireless device. The mobile wireless device can include one or more frequency tracking loops by which frequency differences between a clock source used by the receiver in the mobile wireless device and a clock source used by the transmitter in the wireless access network base station can be estimated and tracked, with subsequent adjustments determined and applied to compensate for the estimated frequency errors.

Several different frequency error estimation methods can be used in a mobile wireless device, each frequency error estimation method used alone or in combination. Different frequency error estimation methods can require different amounts of information, different amounts of computational complexity, and/or different amounts of time to compute frequency error estimates from a set of received digital samples. Different frequency error estimation methods can also result in frequency error estimates that have different levels of accuracy or can provide for correction of frequency errors over different ranges of "pull-in." In some embodiments, a frequency error estimation algorithm can determine receiver sampling frequency errors based on decoding a known transmitted sequence, e.g., a pilot sequence. Differences between a received version of the pilot sequence and a "known" version of the pilot sequence can be used to compute a channel impulse response (CIR), which can characterize a downlink (DL) communication channel (also referred to as a path) between a base station in the wireless access network from which the pilot sequence originates and the mobile wireless device receiving the pilot sequence. Changes in CIR estimates over relatively short periods of time (during which the communication channel can be considered approximately stationary) can be used to characterize frequency errors between the receiver of the mobile wireless device and the transmitter of the base station in the wireless access network. Successive CIR estimates can include accumulated phase shifts that can be used to estimate frequency errors. In other embodiments, actual decoded data sequences can be used to determine CIR estimates from which frequency error estimates can be calculated. Each frequency error estimation algorithm can provide a different frequency "pull-in" range and a different confidence limit for accuracy of the frequency error estimates provided. In addition, a simple linear combination or a weighted linear combination of frequency error estimations computed from different frequency error estimation algorithms may not provide a sufficiently accurate frequency error estimate or may require a longer than desired time for an associated frequency tracking loop to converge in order to determine an accurate frequency error estimate. Therefore, in order to better exploit different pull-in frequency ranges and variable frequency error estimation accuracies provided by different frequency error estimation methods, it can be advantageous to combine multiple frequency error estimation methods into a common algorithm that is scalable, adaptive and robust enough to operate under varying signal quality reception conditions as described further herein. A robust frequency error estimation algorithm can provide improved receiver performance under certain adverse received signal conditions, e.g., when high levels of interference or a relatively low signal to interference plus noise ratio (SINR) exist at the receiver of the mobile wireless device. Representative pilot sequences (or more generally, "known" transmit sequences) can include cell-specific reference signals provided on a set of sub-carriers in particular OFDM symbols of sub-frames transmitted by an evolved NodeB (eNB) of a Long Term Evolution (LTE) wireless network. In some embodiments, the mobile wireless device uses reference signal information provided in a single OFDM symbol to determine a "coarse" frequency error estimate and reference signal information provided in at least two different OFDM symbols to determine a set of "fine" frequency error estimates.

FIG. 1 illustrates a diagram 100 of a generic frequency tracking loop that can be used to estimate a frequency error and to provide a frequency adjustment to compensate for frequency errors in a receiver of a mobile wireless device in a representative wireless system. A set of received digital samples, e.g., obtained from an analog to digital sampling conversion process (not shown) performed on radio frequency waveforms, can be input to a frequency rotator block 102 that can adjust the received digital samples based on an estimated clock frequency difference between the receiver of the mobile wireless device and a transmitter of the wireless access network base station. The output of the frequency rotator block 102 can provide a stream of frequency adjusted received digital samples that can be input to a frequency error estimation block 104. In some embodiments, the frequency error estimation block 104 can use a set of pilot samples, e.g., digital samples extracted from received pilot symbols that are transmitted according to a pre-determined (i.e., known) pattern, to estimate a frequency error. In some embodiments, the frequency error estimation block 104 uses a set of pilot samples contained in a single pilot symbol or within a set of related pilot symbols. In some embodiments, the frequency error estimation block 104 uses information from multiple pilot symbols separated in time by data symbols. In other embodiments, the frequency error estimation block 104 can use a set of data samples, e.g., digital samples extracted from random data signals after demodulation and decoding, to estimate the frequency error. Thus, the error estimation algorithm used in the frequency error estimation block 104 can be based on a known pilot sequence or based on random data. A loop gain 106 can be applied to the frequency error estimates output from the frequency error estimation block 104, and a sequence of loop gain adjusted frequency error estimates can be filtered through a frequency error estimation filtering block 108. The filter block 108 can control a bandwidth of the frequency error estimate signal and can minimize added noise to provide a stable and converging frequency error estimate signal. The filtered frequency error estimate signal output from the filter block 108 can be converted to an appropriate control word in a conversion block 110 to provide a compensation adjustment signal to apply to the frequency rotator block 102. The compensation adjustment signal can update the frequency rotator block 102 that frequency rotates (i.e., phase adjusts) the received digital samples to compensate for frequency differences between the mobile wireless device's receiver frequency and the wireless access network base station's transmitter as determined by the frequency error estimation block 104. The set of blocks illustrated in FIG. 1 illustrate a feedback loop that can estimate and compensate for frequency errors. In some embodiments, the feedback loop 100 illustrated in FIG. 1 is a first order filtered frequency tracking feedback loop. In some embodiments, a frequency compensation adjustment can be applied directly to a clock source (not shown), e.g., a VCXO, in the receiver of the mobile wireless device rather than to a frequency rotator block 102. Thus the sampling frequency of the VCXO clock source can be adjusted to provide different sampling frequencies that generate the received digital samples (and the frequency rotator block 102 can be redundant or not required in some embodiment). The frequency compensation adjustment can alter the sampling frequency used by the receiver to more closely match the transmitter frequency as required.

The frequency error estimation block 104 illustrated in FIG. 1 can estimate a frequency error based on a single received pilot sequence, a portion of a single received pilot sequence, a set of two or more received pilot sequences, or based on data sequences. One method to estimate the frequency error can be based on changes observed in channel impulse response (CIR) estimates derived from received pilot sequences or from received data sequences. A channel impulse response can characterize a communication channel, i.e., the CIR can represent a complex-valued multi-path profile for a communication path from a base station transmitter to a mobile wireless device receiver. The mobile wireless device can estimate the CIR upon an initial connection and during a connection, as changes in the communication channel between the mobile wireless device and the base station of the wireless access network can vary over time. For relatively short periods of time, however, the CIR can be considered approximately stationary (i.e., with a set of unchanging characteristics over the short time interval). The mobile wireless device can measure changes in the CIR over the short time interval and can attribute changes in the CIR at least in part to a difference in sampling frequency between the transmitter used at the base station and the receiver used in the mobile wireless device. Each successive CIR estimate can include embedded phase information that is based on an accumulated frequency error. By comparing phase information contained in two different CIR estimates separated in time, an estimate of the frequency error can be derived. CIR estimation is commonly based on an analysis of received known pilot sequences, e.g., using a sequence of received pilot symbols that can be de-scrambled in the frequency domain and converted into the time domain using an inverse fast Fourier transform (IFFT). For a communication channel that is approximately stationary (i.e., not time varying) over a time interval that includes two different received pilot sequences (or data sequences), if there is no frequency error between the transmitter in the wireless access network base station and the receiver of the mobile wireless device, the CIR values derived from two different pilot sequences (or data sequences) should be the same (in the absence of added noise and/or interference). With a difference in frequency between the transmitter in the base station of the wireless access network and the receiver of the mobile wireless device, however, the CIR values can vary. A frequency error estimation and tracking algorithm in the mobile wireless device use the changing CIR values to determine a frequency error estimate and to track changes in frequency over time. In some embodiments, CIR estimation can also be accomplished using a sequence of received data symbols. For example, an estimate of transmitted data symbols can be determined using equalization and hard decision decoding at the receiver of the mobile wireless device, and a received data symbol sequence can be compared with the estimate of transmitted data symbols to determine a channel impulse response. As frequency error information can be embedded in the estimated CIR through an accumulated frequency error induced phase offset, an estimate of the frequency error can be determined by comparing different CIR estimates derived from data symbol sequences (just as also can be determined using CIR estimates derived from pilot symbol sequences). An effective discriminant to estimate the frequency error can be constructed by correlating CIR estimates derived from two different pilot sequences separated in time, or from two different data sequences also separated in time.

As a representative exemplary embodiment, two different CIR estimates, derived from two different pilot sequences, can be correlated to extract phase difference information. In a representative embodiment, a discriminant can be determined using Equation (1).

$$C_i^* C_{i+1} = |S|^2 e^{j2\pi f_e \Delta T} \quad (1)$$

where $C_i$ can represent a vector of the estimated CIR based on the $i^{th}$ pilot sequence, and each element of $C_i$ can correspond to a different complex-valued channel tap derived from the $i^{th}$ pilot sequence. Similarly, $C_{i+1}$ can represent a vector of the estimated CIR based on the $i+1^{th}$ pilot sequence. The operator * can indicate a Hermitian transpose of a vector two which it is applied. Multiple taps of the CIR can provide higher processing gain, as each tap of the CIR can provide information for a different path of the multi-path channel between the base station and the mobile wireless device. Equation (1) represents an inner product of the two CIR vectors $C_i$ and $C_{i+1}$. The first term on the right hand side of Equation (1), $|S|^2$, can represent an "energy" of the pilot sequence. The second term can represent a complex-valued phase shift corresponding to a frequency error fe and a time separation $\Delta T$ between the two CIR vectors $C_i$ and $C_{i+1}$. In a representative embodiment, the mobile wireless device and the base station of the wireless access network can operate in accordance with a Long Term Evolution (LTE) wireless communication protocol, e.g., as published by the $3^{rd}$ Generation Partnership Project (3GPP) standardization group. In a representative embodiment, pilot sequences are transmitted by the base station of the wireless access network every 5 milliseconds.

In a representative embodiment, a filtered discriminant $d_{f_e}$ can be determined using Equation (2).

$$d_{f_e} = \Sigma_i \alpha_i C_i^* C_{i+1} \quad (2)$$

Equation (2) includes a weighting factor $\alpha_i$ by which the discriminants of Equation (1) can be combined to provide a filtered discriminant value. A high processing gain for the discriminant calculation of Equations (1) and (2) can depend on a length of the pilot sequence, e.g., longer pilot sequences can provide more information and therefore a higher processing gain than shorter pilot sequences. A frequency pull-in range for the frequency error estimate can depend on a time difference ($\Delta T$) between successive pilot sequences, each pilot sequence providing an independent CIR estimate used in the discriminant Equations (1) and (2). In particular, the frequency pull-in range can be inversely proportional to the time difference $\Delta T$, i.e., directly proportional to $1/\Delta T$, so that more widely separated CIR estimates (higher $\Delta T$) can result in a narrower frequency pull-in range (lower $1/\Delta T$). As phase shifts due to a frequency error can accumulate over time, an accumulated phase error greater than $2\pi$ radians can result in an "aliased" frequency error estimate that is not distinguishable from a "correct" frequency error estimate. The frequency pull-in range for a frequency error estimation algorithm using successive (or more generally using multiple time-separated) CIR estimates can be relatively narrower than other frequency error estimation algorithms described further herein that use information that is more restricted in time. The time separation $\Delta T$ between two success pilot sequences can be non-negligible. In a representative embodiment, pilot sequences can be separated by a time interval of 5 milliseconds, which can correspond to a pull-in range of 200 Hz. In another representative embodiment, pilot sequences can be separated by a time interval of 0.5 milliseconds, which can correspond to a pull-in range of 2 kHz.

Another representative method to estimate frequency errors can exploit a progressive phase ramping due to an accumulated frequency error. In some embodiments, a frequency error estimation method that provides for a relatively wider pull-in frequency range can be desired. A wider pull-in frequency range can be useful in certain operating conditions, e.g., when a clock source has a relatively larger variance over time, or when the communication channel between the base station and the mobile wireless device is more rapidly time varying, such as can occur during high speed movement. In addition, a wider pull-in frequency range can be useful when providing for effective handovers of the mobile wireless device between different cells of a wireless access network, or when measuring neighbor cells to determine cells for selection and/or for re-selection.

In order to realize a frequency error estimation algorithm with a larger pull-in frequency range, the frequency error estimation algorithm can use information accumulated over a shorter time interval than used above with successive (or multiple time-separated) CIR estimates. In a representative embodiment, an algorithm can exploit a phase ramping from a single pilot sequence or from a relatively shorter data sequence instead of relying on multiple pilot sequences or on multiple data sequences separated over longer periods of time. In a representative embodiment, an estimate of a frequency error can be obtained using Equations (3) and (4).

$$\hat{f}_e = \mathrm{argmax}_{fe} |X^* D_{fe} Y| \quad (3)$$

$$D_{f_e} = \begin{bmatrix} e^{j2\pi f_e T_s \cdot 0} & 0 & \cdots & 0 \\ 0 & e^{j2\pi f_e T_s \cdot 1} & \cdots & \vdots \\ \vdots & \cdots & \ddots & 0 \\ 0 & \cdots & 0 & e^{j2\pi f_e T_s \cdot (N-1)} \end{bmatrix} \quad (4)$$

In Equation (3), X can represent a reference signal vector, e.g., a known transmitted sequence, while Y can represent a received signal vector, and the * operator can represent a Hermitian (complex conjugate vector) transpose operation. The unknown variable $f_e$ can represent a frequency error for which different values can be searched to find an estimate $\hat{f}_e$ that maximizes the function $|X^* D_{f_e} Y|$. The time variable $T_s$ can represent a time interval between each sample of the reference signal vector X or between each sample of the received signal vector Y. In some embodiments, the samples of the (pilot or data) reference/received signal vector can be spaced equidistant in time. In some embodiments, a phase shift due to an accumulation of the frequency difference between the transmitter of the wireless access network base station and the receiver of the mobile wireless device can increase proportionally to the time interval $T_s$. Thus, each successive sample of the signal vector can be shifted by an additional $2\pi f_e T_s$ radians. The diagonal matrix $D_{f_e}$ can represent a complex-valued phase shift that applies for each of the received samples. A maximum likelihood frequency error estimate $\hat{f}_e$ can be determined using Equations (3) and (4) by searching for a value of the frequency error estimate $f_e$ that maximizes the function $|X^* D_{f_e} Y|$. In a representative embodiment, the maximum likelihood error estimation optimization metric can be approximated by using the imaginary part of the product of a received sample and the complex conjugate of a transmitted reference sample, i.e., by using $\mathrm{Im}\{y_k^* x_k^*\}$, which in turn can be approximated as $k\, f_e$ to derive the discriminant.

In order to create a method that combines estimates provided by two different frequency error estimation techniques, a balance can be sought to use information generated by a "fine" frequency tracking loop and by a "coarse" frequency tracking loop that can operate in parallel. A "fine" frequency tracking loop can refer to a frequency error estimation method that has greater accuracy (higher processing gain) but a narrower frequency pull-in range. The "fine" frequency tracking loop can provide for accurate frequency tracking but can be unable to correct for large frequency errors. The "fine" frequency tracking loop can be used for "fine" adjustment of the frequency tracking with high accuracy; however, large variations or jumps in frequency errors can be not tracked, as a large frequency error change can fall outside of the pull-in range of the "fine" frequency tracking loop. A representative "fine" frequency tracking loop can be based on using pairs of (or more generally multiple) CIR estimates as described hereinabove. A CIR-based frequency error estimation method as disclosed herein can provide a relatively higher processing gain (due to a corresponding to a pilot sequence length) and a relatively narrower frequency pull-in range, the latter which can be limited by the time separation between two successive pilot sequences or data sequences from which the CIR estimates can be derived. A CIR-based frequency error estimation algorithm that uses multiple CIR estimates (derived from pilot sequences and/or from data sequences) can be considered a representative "fine" frequency tracking loop. A "coarse" frequency tracking loop can refer to a frequency error estimation method that has a relatively lower processing gains (worse accuracy) but provides a wider frequency pull-in range. The frequency pull-in range of the "coarse" frequency tracking loop can be limited by the time separation between two adjacent pilot samples (or between two different data samples) instead of the larger time separation between two sets of pilot sequences (or two different data sequences). In general, a representative "coarse" frequency error estimation method for a "coarse" frequency tracking loop can exploit a phase rotation that occurs from sample to sample within a pilot sequence (or within a data sequence). The "coarse" frequency error estimation method can provide a lower processing gain than provided by a "fine" frequency error estimation method, the latter being based on two (or more) time separated channel impulse response estimations. A linear combination or weighted combination of the frequency error estimations provided by a "coarse" frequency error estimation and by a "fine" frequency error estimation in parallel may not achieve a "reasonable" frequency error or can require a long time to converge to a correct value. Thus an "intelligent" combination of the frequency error estimates provided by the "coarse" and "fine" frequency error estimations can be required to achieve higher accuracy with relatively fast convergence times.

During a "far cell" channel condition, which includes a relatively low signal to interference plus noise ratio (SINR) measured at the receiver of the mobile wireless device due to a high level of attenuation of signals from the base station of the wireless access network (or when high levels of interference occurs), a "coarse" frequency error estimation method can produce frequency error estimates with a large variation in values. The large variation in values of individual "coarse" frequency error estimates can potentially exceed a frequency pull-in range of an accompanying "fine" frequency error estimation method. As a result of an inaccurate "coarse" frequency error estimate, the "fine" frequency error estimation method can converge to an incorrect "aliased" frequency error value (at least for a period of time until the incorrect value is recognized and corrected for). Inaccurate "coarse" frequency error estimation can thus result in large overall frequency error estimation fluctuations when combining information from a "coarse" frequency tracking loop (FTL) with a "fine" frequency tracking loop. Moreover, as a "fine" FTL can have a relatively narrower pull-in frequency range, ignoring or disabling the "coarse"

FTL can result in a mobile wireless device remaining "stuck" at an incorrect "aliased" frequency estimation value (or within a particular range of values), as the "fine" FTL cannot distinguish between an incorrect "aliased" frequency estimation value and a correct frequency estimation value (the pull-in frequency range of the "fine" FTL being relatively small). Without adjustments based on the "coarse" FTL, the mobile wireless device, in some circumstances, can drop voice connections or stall data transfers until a correct frequency error estimation is available. In order to achieve a stable frequency error estimation and tracking loop, a method to apply information derived from the "coarse" FTL in combination with a "fine" FTL, without introducing unwanted frequency estimation fluctuations or false alarms, can be desired.

Figure 2:
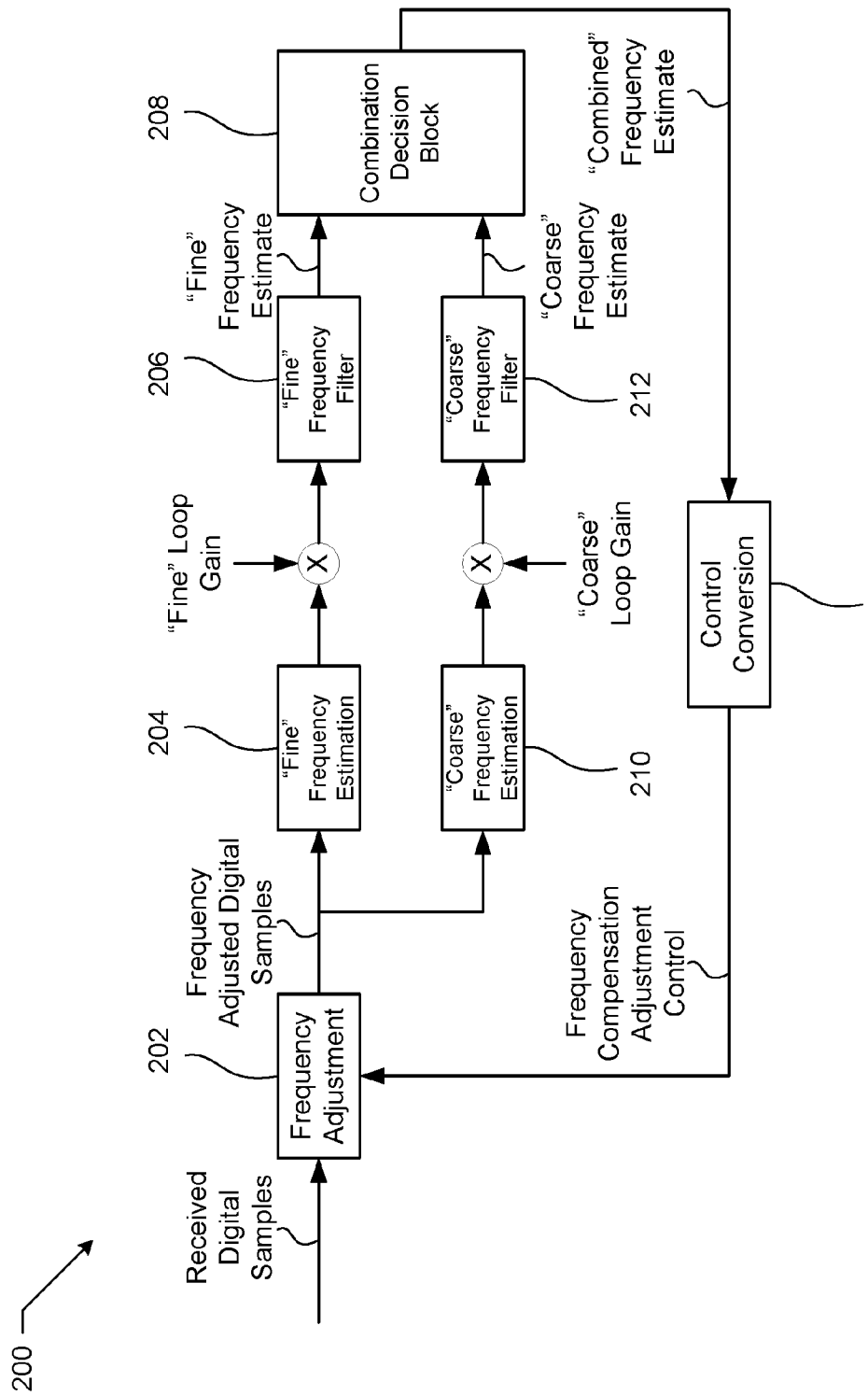
FIG. 2 illustrates a block diagram of a dual frequency tracking loop that combines fine frequency estimation and coarse frequency estimation in accordance with some embodiments.

FIG. 2 illustrates a combination frequency tracking loop 200 that includes "fine" frequency estimation and "coarse" frequency estimation in parallel. As described for the FTL of FIG. 1, a set of received digital samples can be adjusted by a frequency adjustment block 202 to product a set of frequency adjusted digital samples. All or a subset of the frequency adjusted digital samples can be provided to a "fine" frequency estimation block 204 and to a "coarse" frequency estimation block 210 in parallel. It should be noted that the "fine" and "coarse" frequency error estimation blocks 204 and 210 respectively can operate on the same and/or on different sets of frequency adjusted digital samples. As described hereinabove, the "fine" frequency estimation block 204 can use digitally adjusted samples spread out over a longer time interval that those used by the "coarse" frequency estimation block 210. Thus, updates to "fine" frequency estimates output by the "fine" frequency estimation block 204 can occur at a different rate than updates to "coarse" frequency estimates output by the "coarse" frequency estimation block 210. Each of the estimation blocks 204/210 can produce independent "fine" and "coarse" frequency error estimates. In some embodiments, the "fine" frequency estimation block 204 uses a "fine" frequency estimation method based on multiple CIR estimates derived from multiple pilot sequences or derived from multiple data sequences as described hereinabove. In some embodiments, the "coarse" frequency estimation block 210 uses a "coarse" frequency estimation method based on samples of a single pilot sequence or single data sequence as also described hereinabove. Outputs of the "fine" frequency estimation block 204 can be scaled by a "fine" loop gain and passed through a "fine" frequency filter block 206 to produce a filtered "fine" frequency estimate. Similarly, outputs of the "coarse" frequency estimation block 210 can be scaled by a "coarse" loop gain and passed through a "coarse" frequency filter block 212 to produce a filtered "coarse" frequency estimate. The filtered "fine" frequency estimates and the filtered "coarse" frequency estimates can be provided to a combination decision block 208 that can use information provided by both the "fine" and "coarse" frequency estimates to determine jointly a "combined" frequency estimate. In a representative embodiment, the combination decision block 208 uses the "coarse" frequency estimate to determine a range of frequencies within which to use the "fine" frequency estimates to converge to a frequency error estimate as described further herein.

Figure 3:
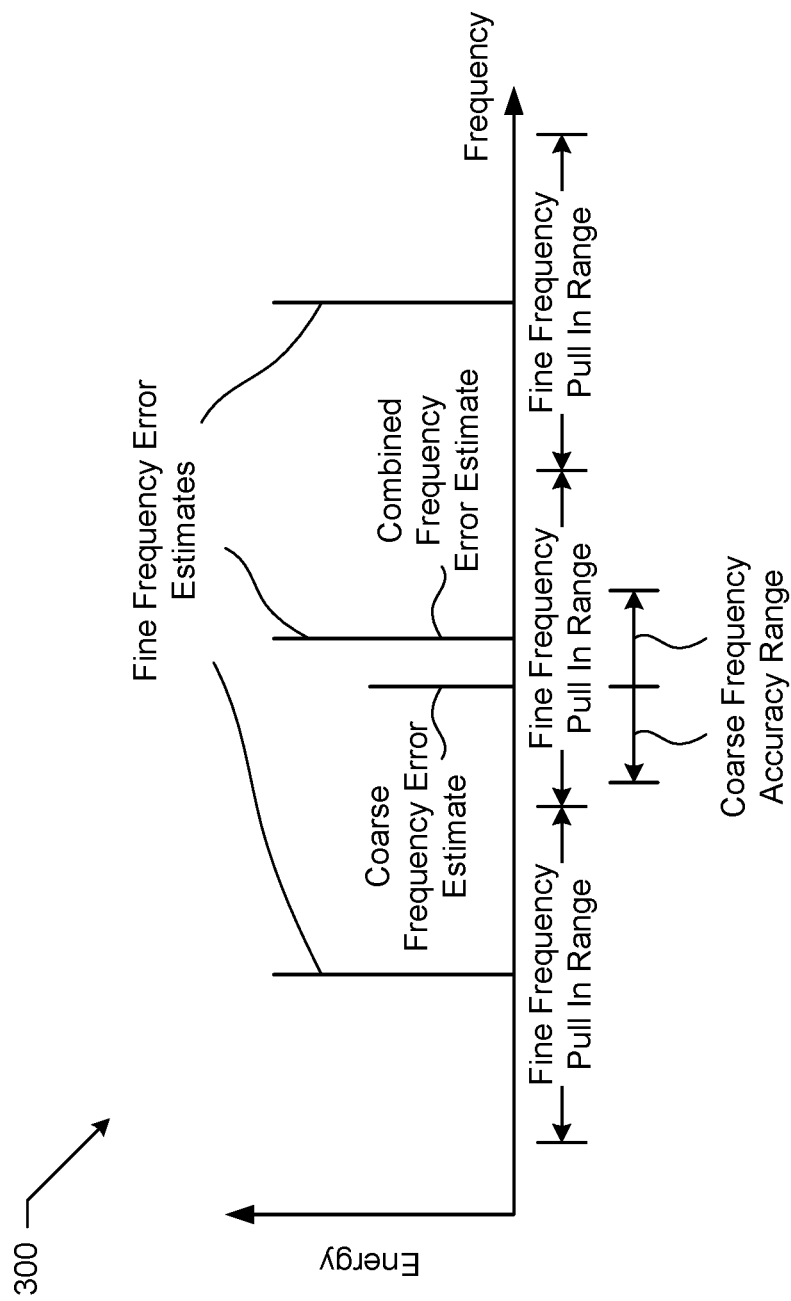
FIG. 3 illustrates a graph demonstrating a combination of fine frequency estimation and coarse frequency estimation in accordance with some embodiments.

FIG. 3 illustrates a graph 300, representing a scalable combination of frequency error estimations provided by a fine frequency tracking loop and a coarse frequency tracking loop. The "fine" frequency error estimation loop can provide multiple candidate "fine" frequency error estimates among which to choose a frequency error estimate. Each candidate "fine" frequency error estimate can cover a range of frequencies, labeled as a fine frequency pull-in range in FIG. 3. The "coarse" frequency error estimation loop can provide a single "coarse" frequency error estimate, and the "coarse" frequency error estimate can be associated with an accuracy that characterizes a range of frequencies in which the coarse frequency error estimate can be considered accurate. When the frequency error estimation accuracy of the "coarse" frequency tracking loop is less than one-half of the pull-in frequency range of the "fine" frequency tracking loop, the combination decision block 208 can select the closest "fine" frequency error estimate as the "combined" frequency error estimate. With a sufficiently accurate "coarse" frequency error estimate (i.e., a sufficiently narrow coarse frequency accuracy range), the closest "fine" frequency error estimate to the "coarse" frequency error estimate can be considered the "best" estimate. When the received signals at the mobile wireless device exceed a signal quality and/or signal strength threshold level, e.g., having an SINR above a threshold value, or a signal strength above a threshold value, or a measured level of noise plus interference below threshold value, a variation of the "coarse" frequency estimates can be small (i.e., a low variance value). With high signal quality, one can conclude with a relatively high probability or success that the closest "fine" frequency estimate to the "coarse" frequency estimate can be the correct value to use. Combining information from the "coarse" frequency estimate and from the "fine" frequency estimates can result in accurate, scalable and adaptive frequency estimation and tracking. The "coarse" frequency estimates can be used to select to a range of frequencies over which the "fine" frequency estimates can be used to converge to an accurate frequency estimate. In some embodiments, when the "coarse" frequency estimate accuracy range exceeds more the one-half the "fine" frequency pull-in range, multiple candidate "fine" frequency error estimates can be possible, a thus a set of "fine" frequency error estimates can provide multiple hypotheses by which to test and seek to converge the frequency error estimation and tracking loop. In some embodiments, the "coarse" frequency tracking loop can be considered an "outer" loop, which provides a range of frequencies to search, while the "fine" frequency tracking loop can be considered an "inner" loop, which can be used to converge to a final frequency value. In some embodiments, the "inner" "fine" frequency loop can be run continuously to estimate and track frequency errors, while the "outer" "coarse" frequency loop can be enabled to run in parallel as required, e.g., to generate an initial estimate upon an initial connection and/or based on determination of a jump in frequency error. In some embodiments, the "coarse" frequency "outer" loop can be enabled adaptively based on a physical layer metric, e.g., an SINR value falling below a threshold, a frequency error estimate change exceeding a threshold, a frequency error accuracy estimate exceeding a threshold, a bit error rate (BER) or block error rate (BLER) exceeding a threshold, or other combination of physical layer metrics. In some embodiments, the "coarse" frequency error estimate and tracking loop can be not enabled continuously to minimize computational requirements and thereby conserve power. In some embodiments, the "coarse" frequency tracking loop and the "fine" frequency tracking loop can each use a different time constant, e.g., the "coarse" frequency tracking loop being operable less frequently than the "fine" frequency tracking loop. An accumulation of a frequency tracking error of sufficient magnitude to require the use of the "coarse" frequency tracking loop can take a longer time to occur, and thus the "coarse" frequency tracking loop can be updated less often without a substantial loss in performance.

In some embodiments, combining information from the "fine" frequency error tracking loop and the "coarse" frequency error tracking loops can be biased to use information from the "coarse" frequency error tracking loop initially when a large frequency error can occur and then adjusted to use information from the "fine" frequency error tracking loop to converge to an accurate frequency error value. As a representative example, a mobile wireless device in use on a high speed train (and thus travelling at a relatively rapid rate through multiple cells with changing directions relative to base stations in each cell), a Doppler shift in frequency can change as the mobile wireless device traverse within a cell (passing the base station) and/or when traversing between cells (and thus moving away from one base station and toward a second base station). A slowly converging, but highly accurate, narrow frequency pull-in range "fine" frequency tracking loop can be inadequate to deal with rapid frequency changes that can occur in the described scenario, and thus a "coarse" frequency tracking loop can be used as required to "adjust" and "realign" frequency error estimates, followed by use of the "fine" frequency error tracking loop to refine an estimate provided by the "coarse" frequency error tracking loop. In some embodiments, the "coarse" frequency error tracking loop can be used when an instantaneous (or filtered) frequency error estimate jumps by more than a threshold value.

Figure 4:
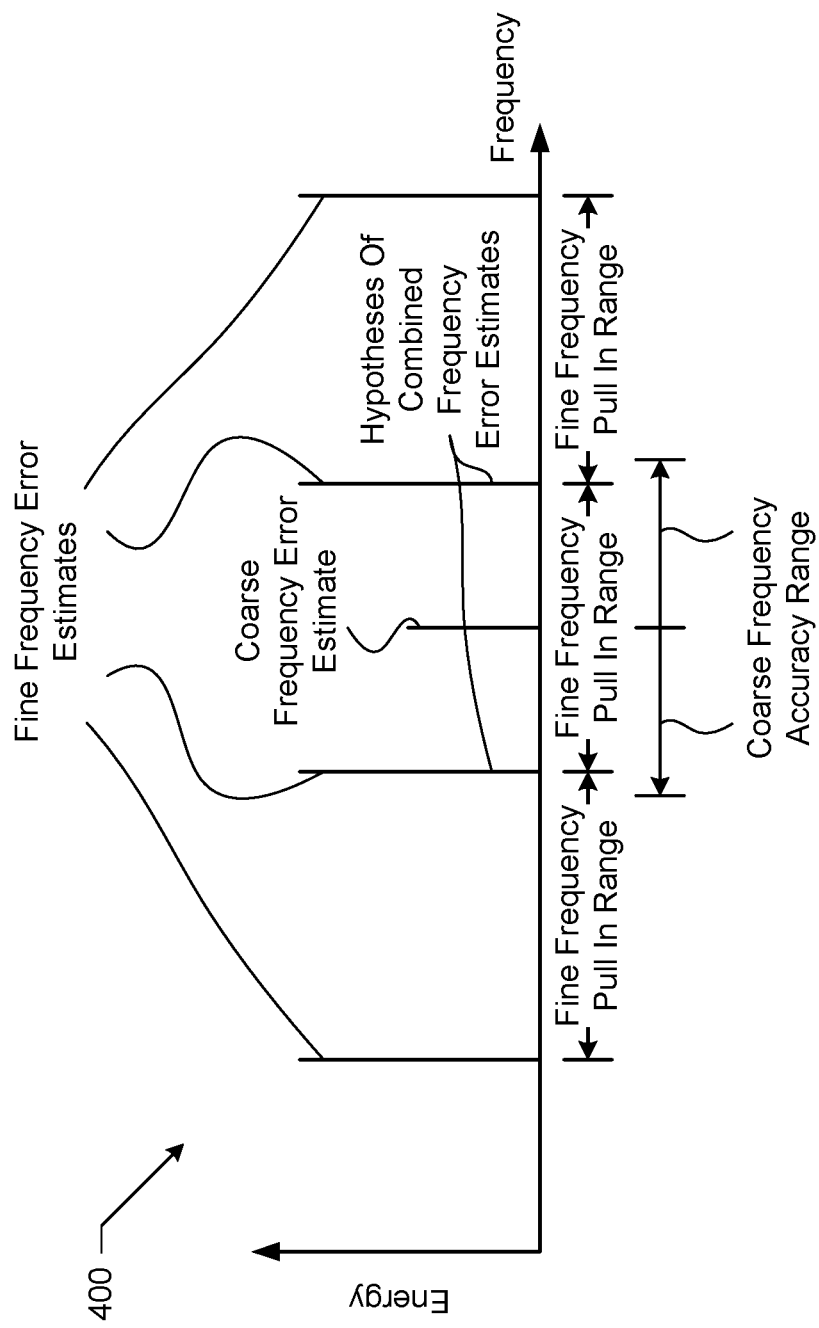
FIG. 4 illustrates another graph demonstrating a combination of fine frequency estimation and coarse frequency estimation in accordance with some embodiments.

FIG. 4 illustrates a graph 400, representing another scalable combination of frequency error estimations from a fine frequency tracking loop and a coarse frequency tracking loop. In the scenario illustrated in FIG. 4, a frequency error estimation accuracy of the "coarse" frequency tracking loop is nearly equal to or more than half of the pull-in range of the "fine" frequency tracking loop. As such, there can be more than one possible "fine" frequency estimate that is "close" to the "coarse" frequency estimate. The true frequency error can be ambiguous, as multiple hypotheses for the combined frequency error estimate can be plausible based on the information provided by the "coarse" and "fine" frequency estimates. As illustrated in FIG. 4, the "coarse" frequency estimate can be nearly equidistant from two different "fine" frequency estimates. In some embodiments, the "coarse" frequency estimate can be closer to one of the "fine" frequency estimates, but the variation in values for the "coarse" frequency estimate can vary more than half of the pull-in frequency range of the "fine" frequency estimates, so that the accuracy of the "coarse" frequency estimate is not inadequate to determine which of the "fine" frequency estimates to choose. In a representative embodiment, a "combined" frequency error estimation algorithm can use a "conservative" hypothesis, e.g., based on examining a most recent past history of frequency error estimates, and use the "fine" frequency tracking loop to converge to a more accurate estimate of the frequency error over time. While this process can take longer than the scenario illustrated in FIG. 3, the disclosed algorithm can still largely reduce the frequency tracking convergence time when compared to starting from a linear combination of fine and coarse frequency tracking loops.

In a representative embodiment, combining information from "fine" and "coarse" frequency estimates, e.g., by the combination decision block 208 of FIG. 2, can be adaptive depending on a scale of an existing frequency error or an amount of residual frequency error that needs to be corrected. In some cases, the coarse frequency tracking loop may not be needed, e.g., once converged to a correct range of frequencies that can be tracked by the "fine" frequency tracking loop, the "coarse" frequency estimate can provide only a "redundant" repeated result that confirms the current range of frequencies used by the "fine" frequency tracking loop. As the "coarse" frequency estimation can require extra computational overhead, the "coarse" frequency estimate can be invoked only as required, or at less frequent time intervals. In this case, it can be advantageous to determine only "fine" frequency estimates (essentially resulting in a "fine" frequency tracking loop only, while suspending the "coarse" frequency tracking loop until required). The "coarse" frequency estimates can be resumed when stability or accuracy of the "fine" frequency estimates is suspect, e.g., when the SINR degrades, or when a sudden change in frequency error estimation values indicates that the "fine" frequency error estimate may have converged to an incorrect aliased frequency estimate rather than to the correct frequency estimate. In another embodiment, a rate at which the coarse frequency error estimates are computed can be scaled down compared with how often the fine frequency error estimates are computed, i.e., can be performed less frequently.

In some scenarios, e.g., when a high received SINR exists, a "coarse" frequency estimation loop can be used initially to determine rapidly a range of frequencies over which a "fine" frequency estimation loop can be used to converge accurately to track frequency variation. In some scenarios, e.g., when a low received SINR exists, the "coarse" frequency estimation loop can provide widely varying values, e.g., can indicate different ranges of frequencies over which to use the "fine" frequency estimation loop. The "noisy" coarse frequency estimates can negatively impact the performance of the mobile wireless device, as sudden changes in frequency can be selected that affects decoding results for received data. With inadequate SINR, it can be difficult to guarantee a coarse frequency tracking loop estimate variation that is less than one-half of the pull-in frequency range of the fine frequency tracking loop. If additional pilot (or data) sequence information is available than is used "normally" by the tracking loops, then in some scenarios, it can be possible to use longer pilot (or data) sequences for the coarse frequency tracking loop (thereby increasing processing gain and lowering the variation of the coarse frequency estimate) or to use more frequently occurring (closer in time spaced) pilot (or data) sequences to increase the pull-in frequency range of the fine frequency tracking loop. In some scenarios, however, the pilot sequence structure is fixed by a communication protocol standard. Thus, in some embodiments, a length of the sequences and/or a spacing between the sequences can be fixed. Variation in the coarse frequency estimates can be thus limited by the length of the pilot sequences available to use. The quality of the received pilot sequence can also be determined by variable communication channel conditions (e.g., weak received signals and/or high noise/interference). Although the probability distribution function (pdf) of the coarse frequency estimates can indicate a high probability of the coarse frequency estimates being within the desired pull-in range of the fine frequency tracking loop, the "tails" of the pdf can result in a non-trivial probability of the coarse frequency estimate being outside of a desired pull-in range. To address the infrequent occurrence of outlying coarse frequency estimate values, the combination decision block 208 can introduce a time hysteresis, a frequency hysteresis, and/or a strength based decision to improve the robustness of the frequency error estimation algorithm.

In a representative embodiment, a time hysteresis can be introduced to control when the coarse frequency error estimation information is combined with the fine frequency error estimation. In an embodiment, a trigger condition can be established based on a magnitude of the difference between the coarse frequency error estimate and the fine frequency error estimate. When the magnitude of the difference is more than a pre-determined value, a trigger can occur. In some embodiments, the pre-determined value for the magnitude of the difference that "triggers" the counter can be based on the pull-in frequency range of the fine frequency error estimation and tracking loop. In an embodiment, the combined frequency error estimate can use the coarse frequency error estimate in combination with the fine frequency error estimate only when N consecutive triggers occur. If the probability of a single "false" alarm (due to an incorrect, outlying coarse frequency estimate value in the "tails" of the pdf) is p, then the probability of N consecutive false alarms can be represented as $p^N$. Higher values of N (i.e., more consecutive triggers) can reduce the probability of incorrectly switching frequency estimates; however, the time to correctly switch can be increased by the time to receive N consecutive triggers. In another embodiment, the combined frequency error estimate can use the coarse frequency error estimate in combination with the fine frequency error estimate when M triggers occur out of N consecutive times, where M<N. In another embodiment, after the mobile wireless communication device has "switched" between two different "fine" frequency estimate hypotheses, e.g., when a relatively large jump in frequency estimate occurs, the combination decision block 208 can use the fine frequency tracking estimates only following the jump, and/or can remain on the "new" frequency for a pre-determined time duration T, thereby prohibiting a switch to another "hypothesis" fine frequency estimate until after the time duration T elapses. A time duration to remain in the range of the new frequency estimate can be adapted as well based on a measure of the accuracy and/or the strength of the coarse frequency estimate(s) that precipitated the switch. In an embodiment, the combination decision block 208 can use fine frequency estimates only after a switch for a period of time $\geq NAT_c$, where $T_c$ can represent a time between successive coarse frequency error estimates, and a value for N selected for the "lock out" time period can be adjusted based on the "strength" and/or "accuracy" and/or a confidence measure of the coarse frequency estimate(s). In each of the embodiments described, the threshold for switching can be increased compared with using the "coarse" frequency estimates individually.

In a representative embodiment, a frequency hysteresis can be introduced to control when the coarse frequency error estimation information is combined with the fine frequency error estimation. In an embodiment, a range of frequencies at and close to the "mid-point" between two different "fine" frequency estimates is considered as "unreliable" by the combination decision block 208. In an embodiment, the combination decision block can require that the coarse frequency estimate be outside of a range of frequencies spanning $$[f_{mid} - \Delta f_{hys}, f_{mid} + \Delta f_{hys}]$$

in order to be considered for combination with the "fine" frequency estimates. The frequency hysteresis can "bias" the combination decision block 208 to use the "current" fine frequency hypothesis value until the "coarse" frequency estimate is "significantly" closer to an adjacent (or different) fine frequency hypothesis value. In an embodiment, time hysteresis and frequency hysteresis can be combined, so that the "coarse" frequency estimate must be repeatedly (and/or frequently) in a range much closer to an adjacent (or different than current) fine frequency hypothesis value in order to indicate a switch of frequencies.

In a representative embodiment, a measure of "strength" of the coarse frequency error estimate can be used to limit false alarms. The strength measure can reflect a confidence in the accuracy of the coarse frequency error estimate. In an embodiment, the strength measure can be a relative measure of the processing gain of the coarse frequency error estimate. The coarse frequency error estimate can be used (or considered for use) with the fine frequency error estimate by the combination decision block 208 when the strength measure exceeds a pre-determined strength threshold value. In some embodiments, the strength threshold test can be combined with time hysteresis and/or frequency hysteresis. In an embodiment, the time hysteresis values, e.g., a value for N and/or M described earlier, can be adjusted based on a measure of the strength of the coarse frequency error estimates. For "higher" strength coarse frequency error estimates, the number of repeated triggers N (or M out of N) can be adjusted lower reflecting increased confidence in the coarse frequency error estimates. For "lower" strength coarse frequency error estimates, the number of repeated triggers N (or M out of N) can be adjusted higher reflecting lowered confidence in the coarse frequency error estimates, and thereby requiring additional triggers to ensure a higher probability of a correct decision when combining the coarse frequency error estimate with the fine frequency error estimate in the combination decision block 208. In an embodiment, the frequency hysteresis values, e.g., the width of the frequency range of the frequency estimates that is considered "suspect" or "blocked" from using the coarse frequency estimate can be narrower for higher strength values of the coarse frequency estimate and wider for lower strength values of the coarse frequency estimate. The combination decision block 208 can thus adjust to variable coarse frequency estimates based on an estimate of the strength and/or the persistence of values for the coarse frequency estimate. When the coarse frequency estimate has a lower strength (or confidence) value, the combination decision block 208 can consider additional information, e.g., more coarse frequency estimates, in order to use the coarse frequency estimates in determining the "combined" frequency estimate. When the coarse frequency estimate has a higher strength (or confidence) value, the combination decision block 208 can require fewer coarse frequency estimates (or accept a broader range of frequency values for the coarse frequency estimate) in order to include the coarse frequency estimate in combination with the fine frequency estimate to determine the "combined" frequency estimate.

Scalable and adaptive frequency estimation and tracking algorithms disclosed herein offer many advantages over conventional frequency estimation and tracking algorithms. A conventional frequency estimation algorithm that linearly combines the frequency error estimations from different frequency error estimations algorithms can be sub-optimal, as the different frequency error estimation algorithms can have different estimation accuracy and pull-in frequency ranges. The disclosed frequency estimation and tracking algorithms provided herein can optimally combine the frequency error estimation from both fine and coarse frequency tracking loops while considering the pull-in range and estimation accuracy of these algorithms. Furthermore, adaptive algorithms can provide more accurate frequency error estimation, especially when higher levels of frequency error variation require both fine and coarse frequency tracking loop results to be effectively used. Finally, adaptive algorithms can provide much faster convergence times and better frequency tracking capabilities in dynamic scenarios such as high-speed train scenarios when compared with conventional algorithms.

Figure 5:
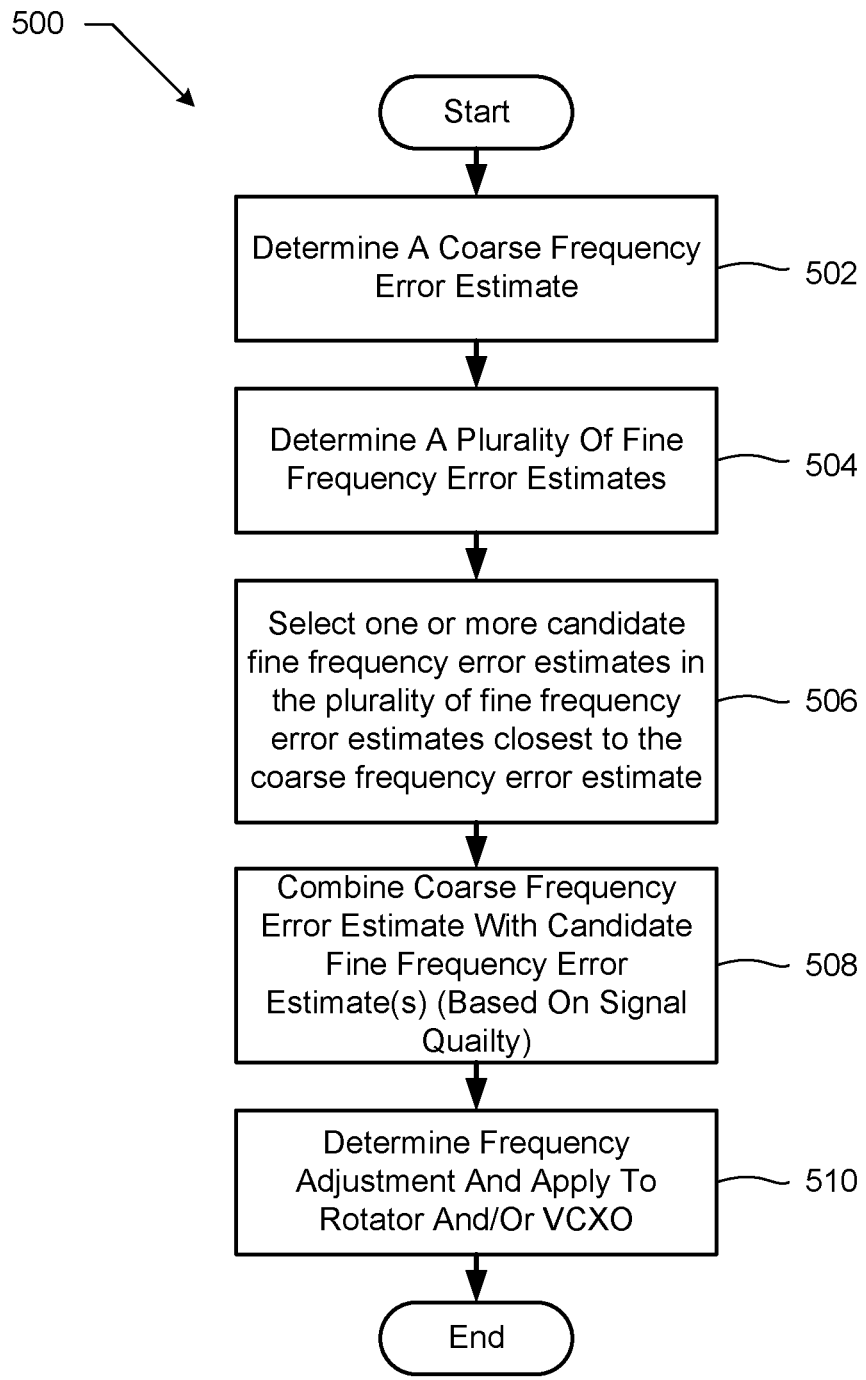
FIG. 5 illustrates a flowchart for a method to combine fine frequency and coarse frequency estimation and tracking in accordance with some embodiments.

FIG. 5 illustrates a diagram 500 of a flowchart for a representative method to combine fine and coarse frequency estimates in a mobile wireless device in accordance with some embodiments. In step 502, a coarse frequency error estimate is determined. In some embodiments, the coarse frequency error estimate is determined based on a measure of phase ramping that can be caused by a sampling frequency error between a transmitter (that sent a reference signal or data) and a receiver (that measured and equalized data). In step 504, a plurality of fine frequency error estimates are obtained. In some embodiments, a fine frequency tracking loop estimate provides the plurality of fine frequency error estimates using a CIR-based frequency estimation technique. In step 506, the one or more candidate fine frequency error estimates are determined from the plurality of fine frequency error estimates. In some embodiments, the one or more candidate fine frequency error estimates include a set of fine frequency error estimates closest to the coarse frequency error estimate. In some embodiments, an accuracy range of the coarse frequency error estimate determines a range of frequencies across which to select the fine frequency error estimates. In step 508, the coarse frequency error estimate can be combined with the set of candidate fine frequency error estimates to provide a frequency error signal. In some embodiments, the combination can account for a measure of signal quality, e.g., an SINR value, when combining information provided by the coarse frequency error estimate and the set of candidate fine frequency error estimates. In step 410, the frequency error signal can be used to determine an adjustment value for a frequency rotator that adjusts received digital samples at the receiver or a frequency correction signal for a voltage controlled crystal oscillator that affects the digital sampling of received analog radio frequency waveforms at the mobile wireless device. The frequency adjustment value and/or the VCXO control signal can be applied to the frequency rotator or the VCXO to correct for an estimated frequency error.

Figure 6:
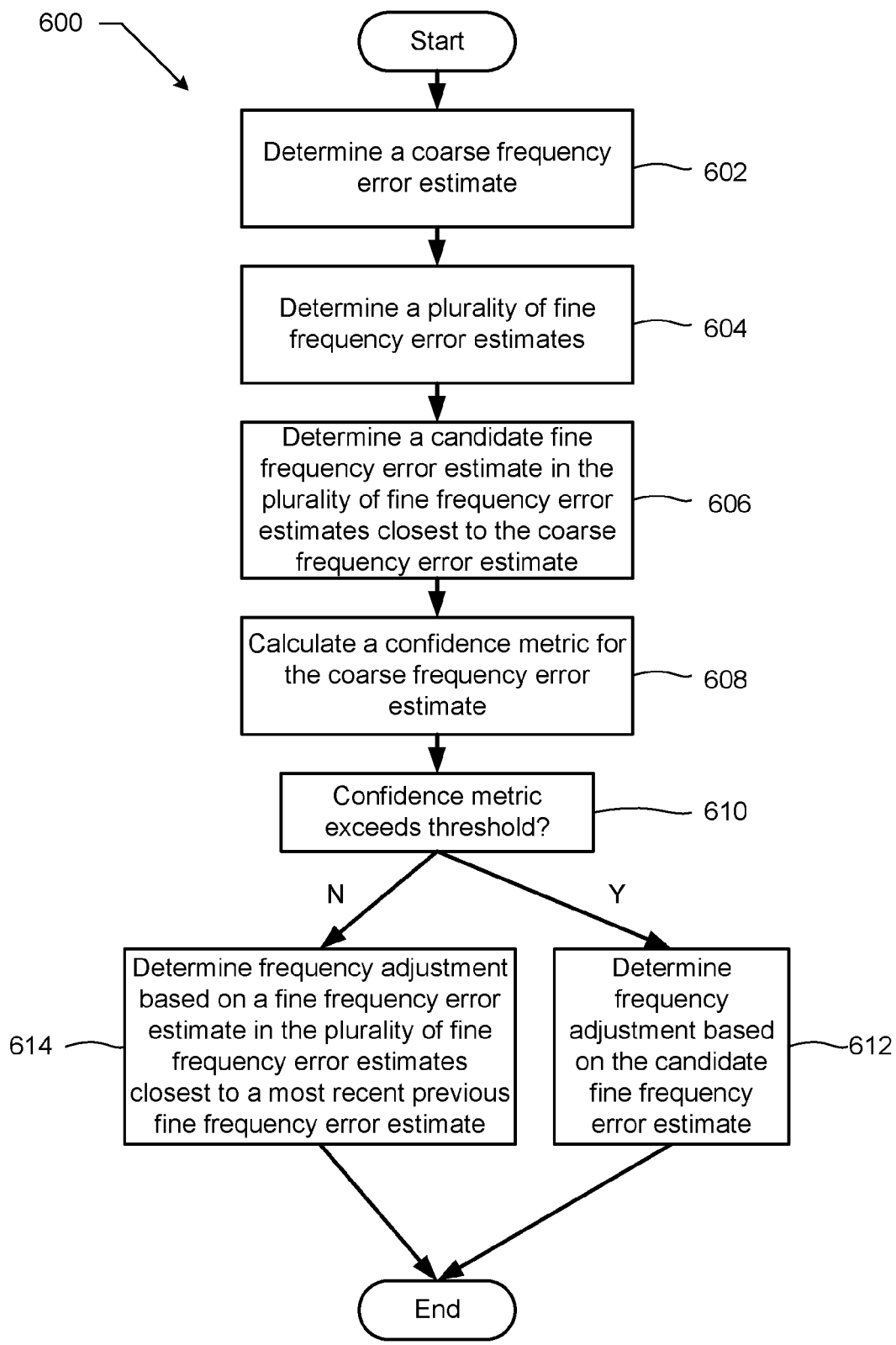
FIG. 6 illustrates a flowchart for another method to combine fine frequency and coarse frequency estimation and tracking in accordance with some embodiments.

FIG. 6 illustrates a flowchart detailing a method 600 for combining fine and coarse frequency estimation results in accordance with the described embodiments. In step 602, a coarse frequency error estimate is determined, e.g., based on a single pilot sequence or data sequence as described herein. In step 604, a plurality of fine frequency error estimates are determined, e.g., using a set of channel impulse response estimates derived from two or more pilot sequences or data sequences. In step, 606, a candidate fine frequency error estimate is determined as the fine frequency error estimate in the set of plurality of fine frequency error estimates closest to the coarse frequency error estimate. A distance between the coarse and fine frequency error estimates can be measured in Hz or in another equivalent frequency metric. In step 608, a confidence metric for the coarse frequency error estimate is calculated. The confidence metric can be based on a time history of recent coarse frequency error estimates, or based on a frequency distance of the coarse frequency error estimate from one or more frequency error estimates in the plurality of fine frequency error estimates, or based on a strength of the coarse frequency error estimates, or based on a combination of these. In step 610, the calculated confidence metric is compared to a pre-determined threshold value. The pre-determined threshold value can be time-based, frequency-based, strength-based, or a combination of such measures. In step 612, when the confidence metric for the coarse frequency error estimate exceeds the threshold value, a frequency adjustment is determined based on the candidate fine frequency error estimate. In step 614, when the confidence metric for the coarse frequency error estimate does not exceed the threshold value, the frequency adjustment is determined based on a fine frequency error estimate in the plurality of fine frequency error estimates that is closest to a most recent previous fine frequency error estimate. The method described in FIG. 6 provides for a robust determination of frequency adjustments based on a combination of coarse frequency error estimates and fine frequency error estimates.

Figure 7:
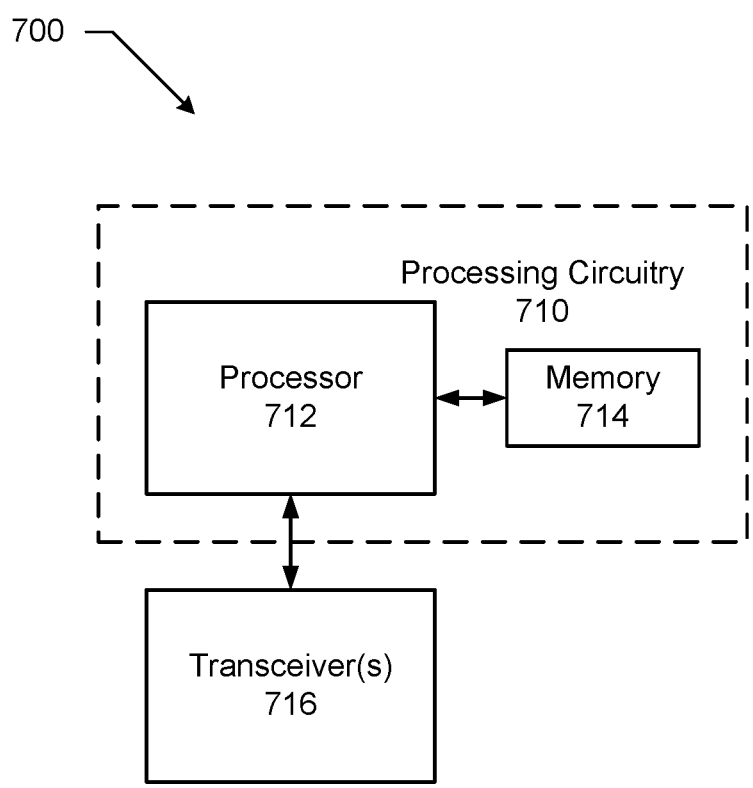
FIG. 7 illustrates a diagram of a representative set of elements included in a mobile wireless device in accordance with some embodiments.

FIG. 7 illustrates a diagram 700 of a representative set of signal processing and/or data processing elements that can be included in a mobile wireless device in which the frequency error estimation and tracking methods described herein are embodied. In some embodiments, the mobile wireless device includes one or more transceivers 716, which can include one or more transmitters and one or more receivers. The transceivers 716 can be included as part of a set of wireless circuitry in the mobile wireless device. A transmitter section of a transceiver can include portions of the wireless circuitry in the wireless communication device that transforms (e.g., modulates and encodes) digital packets into analog radio frequency waveforms and transmits the RF waveforms via one or more antennas to a base station of a wireless access network. Similarly, a receiver section of a transceiver can include a portion of the wireless circuitry in the mobile wireless device that receives RF waveforms through one or more antennas and transforms (e.g., demodulates and decodes) the RF waveforms into digital packets The mobile wireless device can include wireless circuitry that can provide for communication with a wireless network, e.g., an LTE wireless network. The wireless circuitry in the mobile wireless communication device can include processing circuitry 710, e.g., processor 712 coupled to memory 714, and additional wireless circuitry, e.g., transceivers 716, to transmit and receive wireless signals according to various wireless communication protocols. A wireless circuitry module (which can also be referred to as a wireless subsystem) of the mobile wireless device 102 include transmitters and receivers to provide signal processing of radio frequency wireless signals formatted according to wireless communication protocols, e.g., according to an LTE wireless communication protocol, or another cellular wireless communication protocol. In some embodiments, the wireless circuitry module can include components such as: processors and/or specific-purpose digital signal processing (DSP) circuitry for implementing functionality such as, but not limited to, baseband signal processing, physical layer processing, data link layer processing, and/or other functionality; one or more digital to analog converters (DACs) for converting digital data to analog signals; one or more analog to digital converters (ADCs) for converting analog signals to digital data; radio frequency (RF) circuitry (e.g., one or more amplifiers, mixers, filters, phase lock loops (PLLs), and/or oscillators); and/or other components. The wireless circuitry module can be also referred to as a radio in some embodiments. The processing circuitry 710 can operate in combination with the transceivers 716 to perform one or more aspects of the frequency error estimation and tracking methods described herein.

The various aspects, embodiments, implementations or features of the described embodiments can be used separately or in any combination. Various aspects of the described embodiments can be implemented by software, hardware or a combination of hardware and software. The described embodiments can also be embodied as computer program code encoded on a non-transitory computer readable medium for controlling operation of a wireless communication device. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer program code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A mobile wireless device comprising:
   one or more processors; and
   a memory coupled to the one or more processors,
   wherein the memory comprises instructions that when executed by the one or more processors cause the mobile wireless device to:
   determine a coarse frequency error estimate by obtaining a maximum likelihood frequency error value that maximizes a discriminant function based on a set of samples received in a single orthogonal frequency division multiplexing (OFDM) symbol,
   obtain a set of frequency error values based on at least two channel impulse response estimates derived from samples received in two OFDM symbols,
   determine a plurality of fine frequency error estimates based on the set of frequency error values,
   select a first candidate fine frequency error estimate in the plurality of fine frequency error estimates, the first candidate fine frequency error estimate having a first frequency value closest to a corresponding frequency value for the coarse frequency error estimate, and
   determine a frequency adjustment based on the first frequency value.

2. The mobile wireless device of claim 1, wherein the memory comprises further instructions that when executed by the one or more processors cause the mobile wireless device to:
   determine a second plurality of fine frequency error estimates based on a second set of frequency error values;
   select a second candidate fine frequency error estimate in the plurality of fine frequency error estimates, the second candidate fine frequency error estimate having a second frequency value, wherein the second frequency value is closest among the second plurality of fine frequency error estimates to the corresponding frequency value for the coarse frequency error estimate; and
   determine a second frequency adjustment based on the second frequency value.

3. The mobile wireless device of claim 1, wherein the set of samples of the single OFDM symbol comprise a reference signal transmitted by an evolved NodeB of a wireless network operating in accordance with a Long Term Evolution (LTE) wireless communication protocol.

4. The mobile wireless device of claim 1, wherein the two OFDM symbols comprise two reference signals transmitted at least one sub-frame apart in time in accordance with a Long Term Evolution (LTE) wireless communication protocol.

5. The mobile wireless device of claim 1, wherein the discriminant function is based on a reference signal vector, a diagonal matrix, and a received signal vector.

6. A processing circuitry apparatus comprising:
   a processor; and
   a memory coupled to the processor,
   wherein the memory comprises instructions that when executed by the processor cause processing circuitry apparatus to:
   determine a coarse frequency error estimate by obtaining a maximum likelihood frequency error value that maximizes a discriminant function based on a set of samples received in a single orthogonal frequency division multiplexing (OFDM) symbol,
   obtain a set of frequency error values based on at least two channel impulse response estimates derived from samples received in two OFDM symbols,
   determine a plurality of fine frequency error estimates based on the set of frequency error values,
   select a first candidate fine frequency error estimate in the plurality of fine frequency error estimates, the first candidate fine frequency error estimate having a first frequency value closest to a corresponding frequency value for the coarse frequency error estimate, and
   determine a frequency adjustment based on the first frequency value.

7. The processing circuitry apparatus of claim 6, wherein the memory comprises further instructions that when executed by the processor cause the processing circuitry apparatus to:
   determine a second plurality of fine frequency error estimates based on a second set of frequency error values;
   select a second candidate fine frequency error estimate in the plurality of fine frequency error estimates, the second candidate fine frequency error estimate having a second frequency value, wherein the second frequency value is closest among the second plurality of fine frequency error estimates to the corresponding frequency value for the coarse frequency error estimate; and
   determine a second frequency adjustment based on the second frequency value.

8. The processing circuitry apparatus of claim 6, wherein the set of samples of the single OFDM symbol comprise a reference signal transmitted by an evolved NodeB of a wireless network operating in accordance with a Long Term Evolution (LTE) wireless communication protocol.

9. The processing circuitry apparatus of claim 6, wherein the two OFDM symbols comprise two reference signals transmitted at least one sub-frame apart in time in accordance with a Long Term Evolution (LTE) wireless communication protocol.

10. The processing circuitry apparatus of claim 6, wherein the discriminant function is based on a reference signal vector, a diagonal matrix, and a received signal vector.

11. A mobile wireless device comprising:
wireless circuitry including a transceiver;
one or more processors coupled to the wireless circuitry; and
a memory coupled to the one or more processors,
wherein the memory comprises instructions that when executed by the one or more processors cause the mobile wireless device to:
determine a coarse frequency error estimate,
obtain a set of frequency error values based on a set of channel impulse response estimates,
determine a plurality of fine frequency error estimates based on the set of frequency error values,
select a first candidate fine frequency error estimate in the plurality of fine frequency error estimates, the first candidate fine frequency error estimate having a first frequency value closest to a corresponding frequency value for the coarse frequency error estimate,
calculate a confidence metric for the coarse frequency error estimate,
compare the confidence metric to a pre-determined threshold value, and
when the confidence metric exceeds the pre-determined threshold value, determine a frequency adjustment equal to the first frequency value.

12. The mobile wireless device of claim 11, wherein the memory further comprises instructions that when executed by the one or more processors cause the mobile wireless device to:
determine the frequency adjustment based on a fine frequency error estimate in the plurality of fine frequency error estimates that is closest to a most recent previous fine frequency error estimate when the confidence metric does not exceed the pre-determined threshold value.

13. The mobile wireless device of claim 11, wherein the set of channel impulse response estimates comprises at least two channel impulse response estimates.

14. The mobile wireless device of claim 13, wherein the at least two channel impulse response estimates are derived from samples received in two orthogonal frequency division multiplexing (OFDM) symbols transmitted at least one sub-frame apart in time in accordance with a Long Term Evolution (LTE) wireless communication protocol.

15. The mobile wireless device of claim 11, wherein the memory further comprises instructions that when executed by the one or more processors cause the mobile wireless device to:
apply the frequency adjustment to a frequency rotator that adjusts digital samples of radio frequency waveforms received by the transceiver.

16. The mobile wireless device of claim 11, wherein the memory further comprises instructions that when executed by the one or more processors cause the mobile wireless device to:
apply the frequency adjustment to a voltage controlled crystal oscillator (VCXO) that controls sampling of radio frequency waveforms by the transceiver.

17. The mobile wireless device of claim 11, wherein the memory further comprises instructions that when executed by the one or more processors cause the mobile wireless device to:
determine the coarse frequency error estimate by obtaining a maximum likelihood frequency error value that maximizes a discriminant function based on a set of samples received in a single OFDM symbol.

18. The mobile wireless device of claim 17, wherein the set of samples of the single OFDM symbol comprise a reference signal transmitted by an evolved NodeB of a wireless network operating in accordance with a Long Term Evolution (LTE) wireless communication protocol.

19. A processing circuitry apparatus comprising:
a processor; and
a memory coupled to the processor,
wherein the memory comprises instructions that when executed by the processor cause processing circuitry apparatus to:
determine a coarse frequency error estimate,
obtain a set of frequency error values based on at least two channel impulse response estimates derived from samples received in two orthogonal frequency division multiplexing (OFDM) symbols, wherein the two OFDM symbols are transmitted at least one sub-frame apart in accordance with a Long Term Evolution (LTE) wireless communication protocol,
determine a plurality of fine frequency error estimates based on the set of frequency error values,
select a first candidate fine frequency error estimate in the plurality of fine frequency error estimates, the first candidate fine frequency error estimate having a first frequency value closest to a corresponding frequency value for the coarse frequency error estimate,
calculate a confidence metric for the coarse frequency error estimate,
compare the confidence metric to a pre-determined threshold value,
when the confidence metric exceeds the pre-determined threshold value, determine a frequency adjustment based on the first frequency value, and
when the confidence metric does not exceed the pre-determined threshold value, determine the frequency adjustment based on a fine frequency error estimate in the plurality of fine frequency error estimates that is closest to a most recent previous fine frequency error estimate.

20. The processing circuitry apparatus of claim 19, wherein the confidence metric comprises one or more of:
i) a measure of a bit error rate, or
ii) a measure of a block error rate.

* * * * *